(12) United States Patent
Hunt et al.

(10) Patent No.: US 6,728,016 B1
(45) Date of Patent: Apr. 27, 2004

(54) SAFE PROCEDURE FOR MOVING MIRRORS IN AN OPTICAL CROSS-CONNECT SWITCH

(75) Inventors: Peter Hunt, Scotts Valley, CA (US); Adrian Keating, Santa Barbara, CA (US); Kevin White, Los Gatos, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 09/586,730

(22) Filed: Jun. 5, 2000

(51) Int. Cl.⁷ .............................. G02B 26/08; G02B 6/26
(52) U.S. Cl. ........................ 359/223; 385/16; 385/18; 359/900
(58) Field of Search ................................ 359/201, 223, 359/212, 900; 385/16–18, 24, 20, 15

(56) References Cited

U.S. PATENT DOCUMENTS

| | | |
|---|---|---|
| 2,982,859 A | 5/1961 | Steinbrechner |
| 3,492,484 A | 1/1970 | Iti |
| 4,274,712 A | 6/1981 | Sintes |
| 4,365,863 A | 12/1982 | Broussaud |
| 4,421,381 A | 12/1983 | Ueda et al. |
| 4,574,191 A | 3/1986 | Conrad |
| 4,614,868 A | 9/1986 | Alster |
| 4,626,066 A | 12/1986 | Levinson |
| 4,677,290 A | 6/1987 | Mitch |
| 4,696,062 A | 9/1987 | LaBudde |
| 4,746,195 A | 5/1988 | Auracher et al. |
| 4,758,061 A | 7/1988 | Horn |
| 4,823,402 A | 4/1989 | Brooks |
| 4,838,631 A | 6/1989 | Chande et al. |
| 4,838,637 A | 6/1989 | Torok et al. |
| 4,859,012 A | 8/1989 | Cohn |
| 4,892,388 A | 1/1990 | Taylor |
| 4,981,335 A | 1/1991 | Gaebe |
| 5,077,622 A | 12/1991 | Lynch |
| 5,077,815 A | 12/1991 | Yoshizawa et al. |

(List continued on next page.)

FOREIGN PATENT DOCUMENTS

| | | |
|---|---|---|
| EP | 0 834759 A2 | 4/1998 |
| EP | 0 980014 A1 | 2/2000 |
| EP | 120989 A1 | 8/2001 |
| EP | 1 120677 A2 | 8/2001 |
| GB | 2 175 705 A | 12/1986 |
| GB | 2 239 101 A | 6/1991 |
| GB | 2 275 787 A | 9/1994 |
| GB | 2 328 312 A | 2/1999 |
| JP | 60-107017 | 6/1985 |
| JP | 5-107485 A | 4/1993 |
| JP | 6-180428 | 6/1994 |
| WO | WO 99/66354 | 12/1999 |
| WO | WO 00/20899 | 4/2000 |
| WO | WO 01/33898 A2 | 5/2001 |
| WO | WO 01/39413 A2 | 5/2001 |

OTHER PUBLICATIONS

Janusz Bryzek, Kurt Petersen, & Wendell McCulley, "Micromachines on the March," IEEE Spectrum, pp. 20–31 (May 1994).

(List continued on next page.)

Primary Examiner—James Phan
(74) Attorney, Agent, or Firm—Blakely, Sokoloff, Taylor & Zafman LLP (57) ABSTRACT

A method of moving reflectors in an optical cross-connect switch. In one embodiment, the optical cross-connect switch identifies a reflector path avoiding possible interference with other reflectors, predicts the reflector path from pre-computed tables, and moves the reflector in a straight line in target reflector plane coordinates from initial position to target position.

9 Claims, 10 Drawing Sheets

U.S. PATENT DOCUMENTS

| | | |
|---|---|---|
| 5,097,354 A | 3/1992 | Goto |
| 5,172,262 A | 12/1992 | Hornbeck |
| 5,177,348 A | 1/1993 | Laor |
| 5,383,118 A | 1/1995 | Nguyen |
| 5,440,654 A | 8/1995 | Lambert, Jr. |
| 5,450,512 A | 9/1995 | Asakura |
| 5,467,191 A | 11/1995 | Kishner |
| 5,471,332 A | 11/1995 | Shiragaki et al. |
| 5,495,328 A | 2/1996 | Spence et al. |
| 5,524,153 A | 6/1996 | Laor |
| 5,546,484 A | 8/1996 | Fling et al. |
| 5,555,558 A | 9/1996 | Laughlin |
| 5,568,575 A | 10/1996 | Sato |
| 5,600,739 A | 2/1997 | Anderson et al. |
| 5,621,829 A | 4/1997 | Ford |
| 5,623,337 A | 4/1997 | Iori et al. |
| 5,627,669 A | 5/1997 | Orino et al. |
| 5,629,790 A | 5/1997 | Neukermans et al. |
| 5,648,618 A | 7/1997 | Neukermans et al. |
| 5,671,304 A | 9/1997 | Duguay |
| 5,673,139 A | 9/1997 | Johnson |
| 5,726,815 A | 3/1998 | Gunter et al. |
| 5,832,415 A | 11/1998 | Wilkening et al. |
| 5,841,917 A * | 11/1998 | Jungerman et al. ........... 385/17 |
| 5,867,297 A | 2/1999 | Kiang et al. |
| 5,907,425 A | 5/1999 | Dickensheets et al. |
| 5,912,608 A | 6/1999 | Asada |
| 5,914,207 A | 6/1999 | Nishiki et al. |
| 5,920,417 A | 7/1999 | Johnson |
| 5,960,132 A | 9/1999 | Lin |
| 5,963,682 A | 10/1999 | Dorschner et al. |
| 5,982,554 A | 11/1999 | Goldstein et al. |
| 6,002,818 A | 12/1999 | Fatehi et al. |
| 6,031,656 A | 2/2000 | Little et al. |
| 6,049,412 A | 4/2000 | Bergmann et al. |
| 6,057,921 A | 5/2000 | Yao |
| 6,061,369 A | 5/2000 | Conradi |
| 6,075,639 A | 6/2000 | Kino et al. |
| 6,097,858 A | 8/2000 | Laor |
| 6,097,859 A * | 8/2000 | Solgaard ..................... 385/17 |
| 6,097,860 A | 8/2000 | Laor |
| 6,101,299 A | 8/2000 | Laor |
| 6,125,335 A | 9/2000 | Simon et al. |
| 6,127,679 A | 10/2000 | Ashley et al. |
| 6,137,926 A | 10/2000 | Maynard |
| 6,183,918 B1 | 2/2001 | Nishiki |
| 6,201,622 B1 | 3/2001 | Lobbett et al. |
| 6,208,469 B1 | 3/2001 | Matsuura |
| 6,208,784 B1 | 3/2001 | Glen et al. |
| 6,222,679 B1 | 4/2001 | Nevis |
| 6,236,481 B1 | 5/2001 | Laor |
| 6,245,590 B1 | 6/2001 | Wine et al. |
| 6,249,626 B1 | 6/2001 | Bergmann |
| 6,253,001 B1 | 6/2001 | Hoen |
| 6,253,010 B1 | 6/2001 | Belser et al. |
| 6,256,430 B1 | 7/2001 | Jin et al. |
| 6,262,827 B1 | 7/2001 | Ueda et al. |
| 6,289,145 B1 | 9/2001 | Solgaard et al. |
| 6,295,154 B1 | 9/2001 | Laor et al. |
| 6,317,530 B1 | 11/2001 | Ford |
| 6,320,993 B1 | 11/2001 | Laor |
| 6,320,998 B1 | 11/2001 | Okayama et al. |
| 6,327,398 B1 | 12/2001 | Solgaard et al. |
| 6,330,102 B1 | 12/2001 | Daneman et al. |
| 6,347,167 B1 | 2/2002 | Hagelin |

OTHER PUBLICATIONS

"Lucent's New All–Optical Router Uses Bell Labs Microscopic Mirrors," Bells Labs press release, pp. 1–4, Nov. 10, 1999. http://www.bell–labs.com/news/1999/november/10/1.html.

M. Adrian Michalicek, Wenge Zhang, Kevin F. Harsh, Victor M. Bright, and Y.C. Lee, "Micromirror Arrays Fabricated by Flip–Chip Assembly," Part of the SPIE Conference on Miniaturizes Systems with Micro–Optics and MEMs, Santa Clara, SPIE vol. 3878, pp. 68–79 (Sep. 1999).

Ming C. Wu, "MEMS for Optical and RF Applications." UCLA Extension, Department of Engineering, Information Systems and Technical Management, Engineering: 823.52, Nov. 1–3, 1999.

M.C. Wu, L.–Y Lin, S.–S. Lee, and K.S.J. Pister, "Micromachined Free–Space Integrated Micro–Optics," Sensors and Actuators A, 50, pp. 127–134 (1995).

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum,, L. Zhang, and C.R. Giles, "Fully Provisional 112×112 Micro–Mechanical Optical Crossconnect With 35.8Tb/s Demonstrated Capacity," OFC 2000 Tech. Dig., Baltimore, Maryland, pp. 202–204 (Mar. 7–10, 2000).

Lau, K.Y., "MEM's The Word For Optical Beam Manipulation", IEEE Circuits and Devices Magazine, IEEE Inc. New York, US, vol. 13, No. 4, Jul. 1997, pp. 11–18, XP000831634, ISSN: 8755–3996.

Lih Y. Lin and Evan L. Goldstein, "Micro–Electro–Mechanical Systems (MEMs) for WDM Optical–Crossconnect Networks," IEEE, pp. 954–957 (1999) (no month).

* cited by examiner

SAFE PROCEDURE FOR MOVING MIRRORS IN AN OPTICAL CROSS-CONNECT SWITCH

The present invention relates to the field of optical switching. More particularly, the present invention relates to techniques for positioning optical reflectors in optimal positions.

BACKGROUND OF THE INVENTION

A micro-electro-mechanical-system ("MEMS") device is a micro-sized mechanical structure having electrical circuitry fabricated using conventional integrated circuit ("IC") fabrication methods. One type of MEMS device is a microscopic gimbaled mirror device. A gimbaled mirror device includes a mirror component, which is suspended off a substrate, and is able to pivot about an axis caused by, for example, electrostatic actuation. Electrostatic actuation creates an electric field that causes the mirror component to pivot. The electrostatic actuation is typically induced by pairs of parallel plate electrodes residing beneath the movable members of the gimbaled mirror device.

By allowing the mirror component to pivot, the mirror component is capable of having an angular range of motion. The gimbaled mirror may be used to reflect light in X and Y axes.

MEMS mirrors typically resonate at a relatively low resonant frequency. When moving the mirrors to create new paths, MEMS mirrors typically show a strong tendency to resonate. Significant oscillations in the order of 30 follow an abrupt move, while overshoots approach 75%.

A 3D mirror has two axes, and therefore two significant resonances. There will be others that will be excited during normal activity. For example vertical vibrations of various parts of the assembly, and the flexing of the frame. Additionally, there can be a great deal of cross coupling between the driving forces on the two axes. A change in voltages to rotate one axis can also modify the torque on the other axis. Similarly, a change in the angular position of one axis can modify the torque exerted on the other axis.

One approach to solving these problems is to use position sensors and active feedback loops. However, addition of sensors, feedback loops and control processing adds complexity to the device. Further, component drift may give rise to instabilities, and the creation of resonances and overshoot.

Overshoot can be a problem, putting a mirror into an unstable region, or causing excessive movement beyond the working range of a mirror. Overshoot may lead to mirror lockup or breakage.

The geometry of an assembly holding multiple gimbaled mirror devices may also change with temperature and time. A resulting problem from a drifting mirror position is that the path of light reflected by the gimbaled mirror will change. A small change in mirror position could lead to a large change in the position of an end of a beam of light.

SUMMARY OF THE INVENTION

A method of moving reflectors in an optical cross-connect switch is described. In one embodiment, the optical cross-connect switch identifies a reflector path avoiding possible interference with other reflectors, predicts the reflector path from pre-computed tables, and moves the reflector in a straight line in target reflector plane coordinates from initial position to target position.

Other features and advantages of the present invention will be apparent from the accompanying drawings and from the detailed description that follows below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and system for safe movement of mirrors in an optical cross-connect switch is disclosed.

An application of the gimbaled mirror device is a self contained optical switch. A MEMS switch module (MSM) does the actual optical switching in the self contained optical switch. In one embodiment, two arrays, or planes, of mirrors are placed and controlled so that light from any one incoming fiber can be directed to any one outgoing fiber. An optical connection is made when a mirror in the first mirror plane, illuminated by an input fiber, directs the light to a mirror in the second mirror plane, which directs this light to an output fiber.

A two step process for moving mirrors in an optical cross-connect switch is disclosed. In the one step, a path is identified that avoids the most crosstalk. In the second step, a plurality of steps are used to move the mirrors along the identified path, controlling the acceleration and deceleration separately to avoid resonance.

Figure 1:
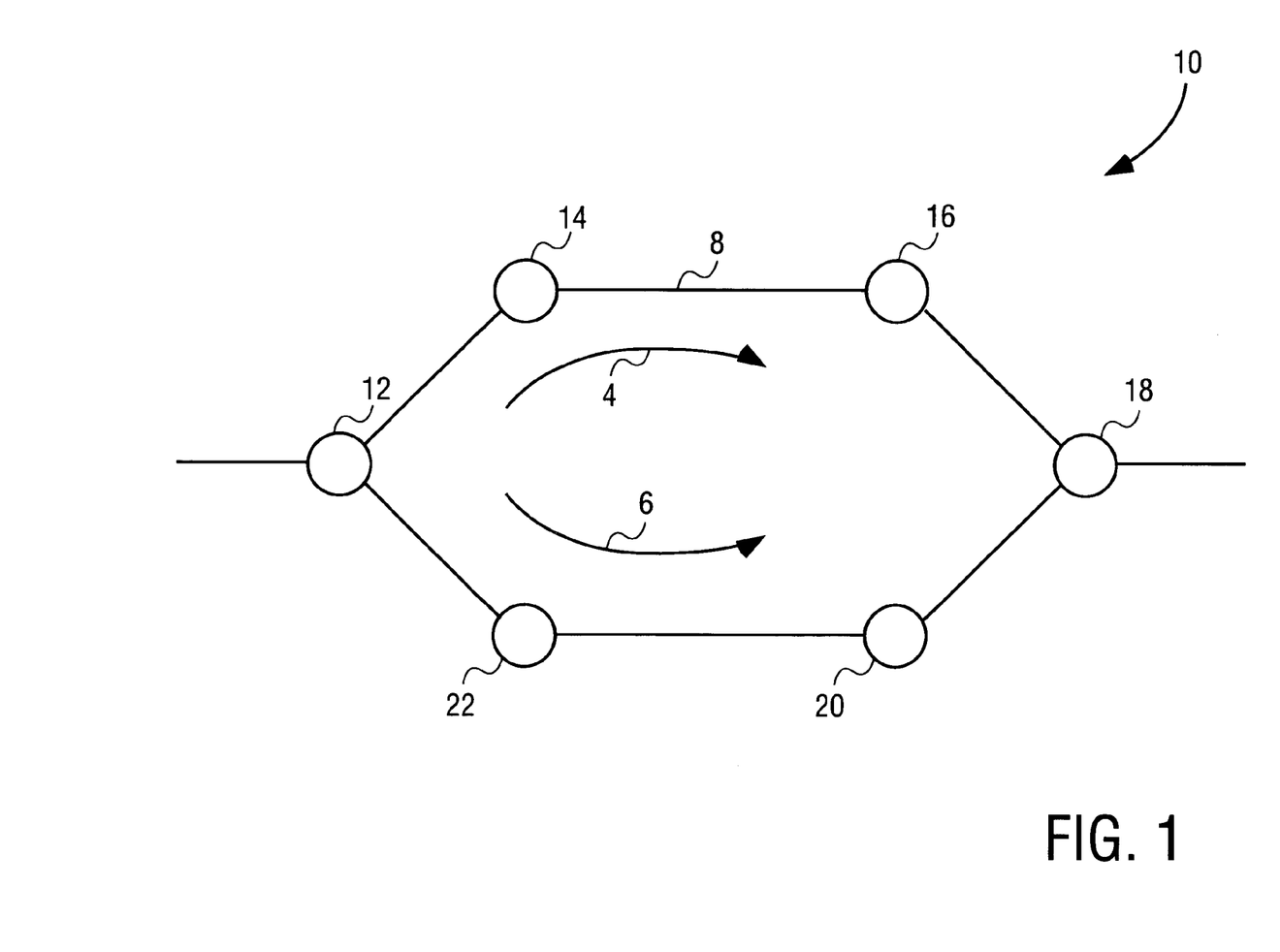
FIG. 1 shows an optical network with optical cross-connect switches.

FIG. 1 illustrates a fiber optic network 10 that employs optical cross-connect switches 12, 14, 16, 18, 20 and 22. The optical cross-connect switches 12, 14, 16, 18, 20 and 22 allow the optical network 10 to recover from failures relatively rapidly. For example, if the optical fiber line connecting switches 14 and 16 is accidentally severed, the data carried by optical signals through path 4 will not be able to make it to switch 18. In the event of such a failure, optical cross-connect switch 12 would redirect the optical path from path 4 to path 6, thereby avoiding the cut in the fiber line 8.

The optical fiber network 10 can carry digital data, voice signals, and video signals over fiber optic lines at various transmission speeds. Digital fiber optic network 10 can also send Internet and Intranet traffic. Digital fiber optic network 10 can, for example, use dense wave length division multiplexing (DWDM) technology to transfer digital information at a very high capacity.

Figure 2:
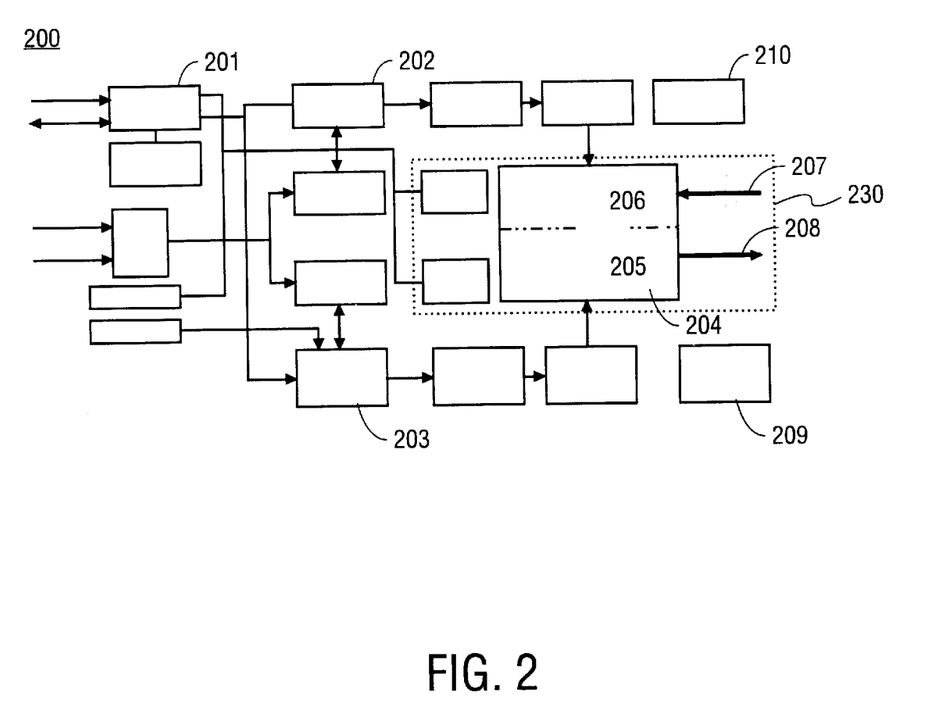
FIG. 2 is a block diagram of one embodiment of an optical cross-connect matrix module.

FIG. 2 is a block diagram of one embodiment of an optical cross-connect matrix module 200. Referring to FIG. 2, the optical cross-connect matrix module 200 includes optical switch 204 including two planes of mirrors 205 and 206, a matrix control processor 201 and two digital signal processors (DSPs) 202, 203.

The matrix control processor 201 is responsible for initiating all the tasks that are performed within the matrix module 200. The two DSPs 202, 203 may be commanded to perform photo-sensing and/or mirror moving, and do most of the local processing.

The optical switch 204 is part of optical switch module, or fiber and mirror array assembly, 230. Optical switch 204 receives signal from input fibers 207 and outputs the switched signal through output fibers 208. In one embodiment, the matrix module 200 includes a low voltage power supply 209 and a high voltage power supply 210.

It will be appreciated that all of the components described are not necessary for this invention, and components may be added or deleted depending on the system requests.

Figure 3:
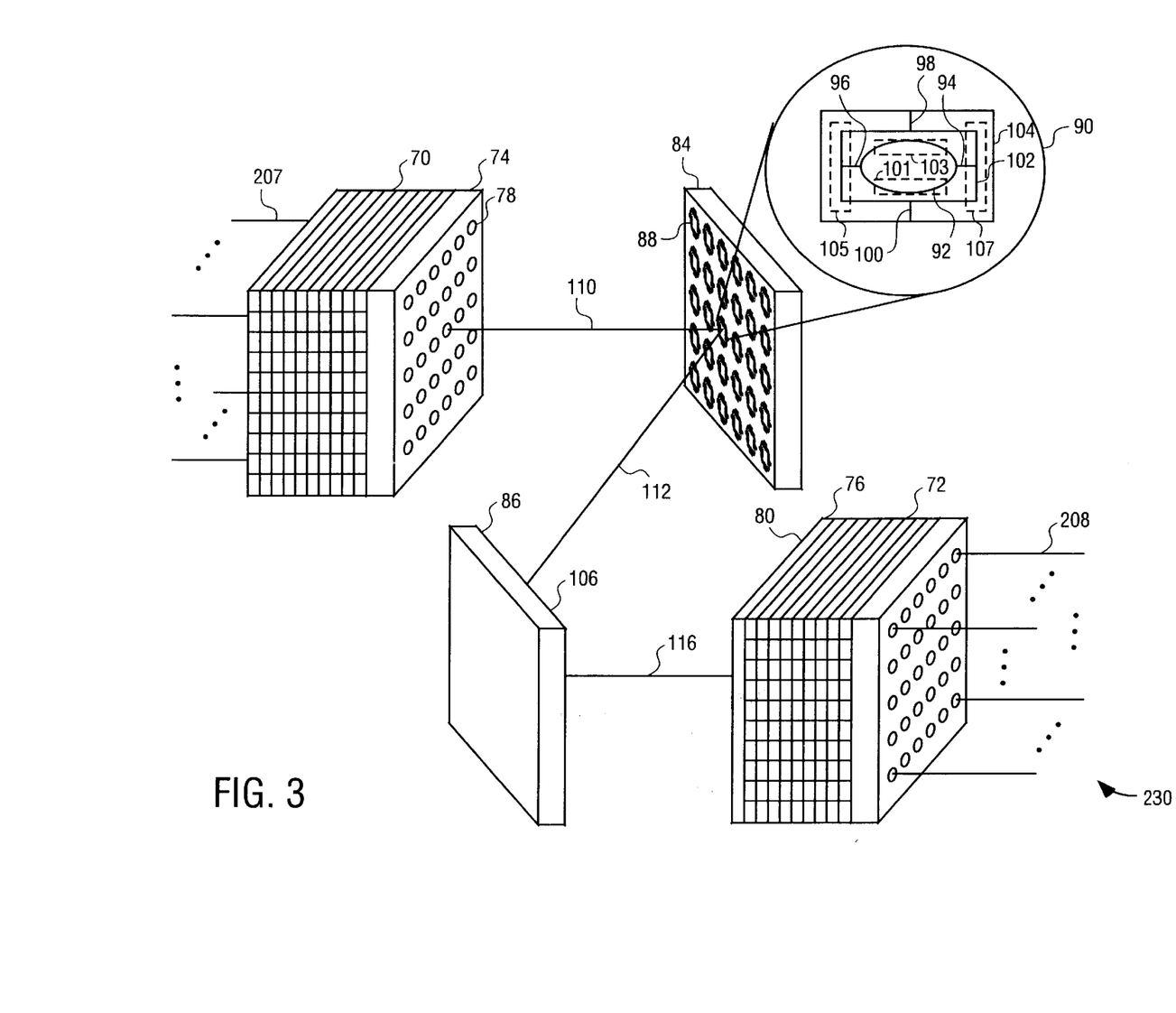
FIG. 3 illustrates the mirror planes, lens assemblies, and fiber blocks of the optical cross-connect switch.

FIG. 3 illustrates fiber and mirror array assembly 230. Fiber and mirror array assembly 230 includes input fibers 207, input fiber block 70, lens array 74, first mirror assembly 84, second mirror assembly 86, output fiber block 72, second lens array 76, and output fibers 208.

Input fiber block 70 includes a plurality of input optical fibers 207 for transmitting light to first lens array 74. First lens array 74 includes a plurality of optical lenses 78 that are used to direct collimated beams of light from input fiber block 70 to individual MEMS mirror devices 88 on first mirror array 84.

The switching system receives either working light and/or test light which are input to fiber and mirror array assembly 230 through input fibers 207. Working light may be customer light or any light source that carries information. Test light is used where there is no working light, or where working light can otherwise not be used. An input/output module (not shown) provides a consistent light source (when requested), and a measure of the power of the light. The matrix module 200 may request either working or test light. The matrix module 200 may also turn off the test light when it has finished with it.

First MEMS mirror array 84 includes a plurality of electrically addressable MEMS mirror devices 88, such as, for example, MEMS mirror device 90, which is shown in a blow-up view in FIG. 3.

MEMS gimbaled mirror device 90 is also referred to as MEMS gimbaled mirrored reflector 90. Gimbaled mirrored device 90 includes a reflector or mirror 92 that is connected to a frame 102 via gimbals 94 and 96. Frame 102 is in turn connected to an outer frame 104 via gimbals 98 and 100. Gimbals 94 and 96 reside in the same axis. Gimbals 98 and 100 reside in the same axis. The axis of gimbals 98 and 100 is perpendicular to the axis of gimbals 94 and 96.

Gimbals 94 and 96 allow mirror or reflector 92 to rotate in a Y direction. Gimbals 98 and 100 allow frame 102 holding reflector 92 to rotate in the X direction. Thus, the gimbaled arrangement of MEMS device 90 allows the mirror 92 to direct light in X or Y directions. Parallel plate electrostatic actuators 101, 103, 105, 107 provide the force for moving the gimbaled mirror 92 in both X or Y directions.

For alternative embodiments, MEMS mirror device 90 may be of different shapes or configurations. For example, the mirror component 92 may be circular, oval, or rectangular.

MEMS mirror assembly 84 is also referred to as MEMS mirror array 84, first mirror plane 84 or first reflector plane 84. First mirror assembly 84 includes an array 88 of MEMS gimbaled mirrors. Each MEMS mirror of array 88 such as MEMS mirror 90 can reflect a light beam. Thus, the MEMS mirror array 84 has mirror components that can redirect or reflect a light beam to differing MEMS mirror devices on second MEMS mirror assembly 86.

Figure 4:
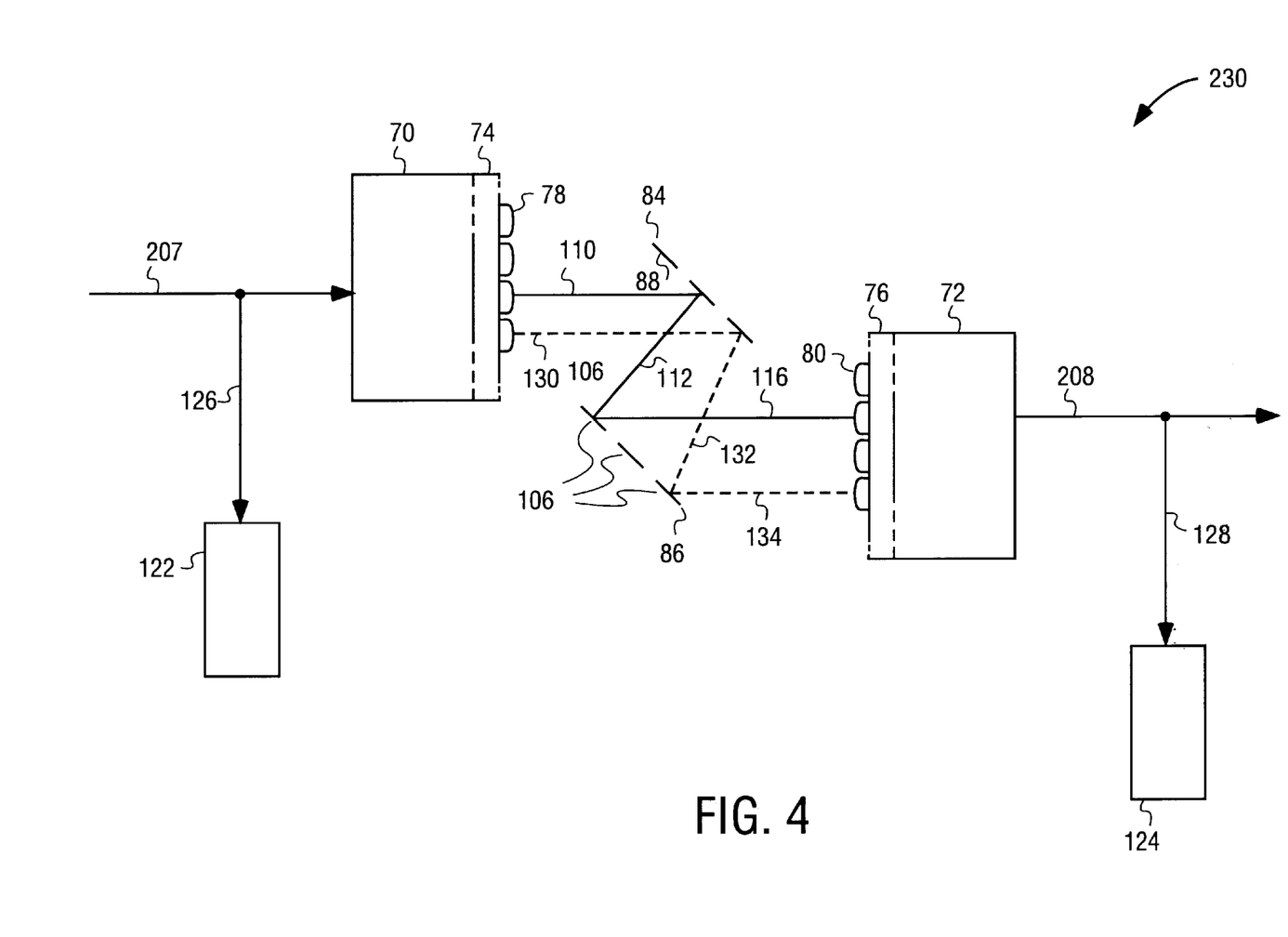
FIG. 4 is a top view of optical power detectors, the fiber blocks, the lens assemblies, and the mirror planes of the optical cross-connect switch.

Second MEMS mirror assembly 86 includes an array of MEMS mirrors 106 that can redirect light beams to second lens array.76, which includes a series of lenses 80 (shown in FIG. 4). Second lens array 80 accepts collimated light beams from the second MEMS mirror assembly 86 and focuses the light beams to individual fibers 208 of fiber block assembly 72.

Alternatively, in another embodiment, there can be more than two planes of mirrors.

For one embodiment of the invention, the mirror array 84 contains 256 mirrors. Accordingly, there would be 256 fibers making up fibers 207, and 256 mirrors 106 making up second mirror array 86, along with 256 fibers 208. There would also be 256 lenses 78 and 256 lenses 80. For an alternative embodiment, mirror assembly 84 contains 1,024 respective mirrors. There would accordingly be 1,024 lines 207, lines 208, lenses 78 and lenses 80.

Alternatively, the fiber and mirror assembly 230 can have any number of mirrors and fibers.

Fiber and lens assembly 230 thus allows light beams from any input fiber 207 of input fiber block 70, to be redirected to any output fiber 208 of output fiber block 72. For example, a light beam 110 received from one of the input fibers 207, fiber block 70 and one of the lenses 78 is reflected by and redirected by mirror 90 of mirror assembly 84. The light beam 110 is reflected as light beam 112, which is transported from first mirror assembly 84 to second mirror assembly 86. Light beam 112 is reflected by and redirected by one of the MEMS mirrors 106 of second mirror assembly 86. The redirected light beam 112 becomes light beam 116 that travels between one of the MEMS 106 and is received by one of the lenses 80 of output lens array 76. The light beam 116 in turn is focused by one of the lenses 80 and sent through fiber block 72 onto one of the output fiber optic lines 209. A light beam thus follows a path comprised of beams 110, 112, and 116 through the fiber and mirror assembly 230.

FIG. 4 is a top view of fiber and mirror assembly 230 that also shows light detectors 122 and 124. Light detector 122 is connected via fiber optic cable 126 to input fiber lines 207. Light detector 122 is also called light power sampler 122 or optical power detector 122. Optical detector 122 detects the power of the input light residing on respective input lines 207.

Optical power detector 124 is coupled to output fibers 208 via fiber lines 128. Optical output power detector 124 is also called light sampler 124 and light power detector 124. Detector 124 detects the optical power of light residing on respective output fiber optic lines 208.

For alternative embodiments, of the present invention, detectors 122 and 124 can be of different designs. For example, detectors can be designed to detect the light beams residing between input lens assembly 74 and output lens assembly 76. Thus, light detectors could be designed to detect the optical power of light beams 110, 112, and 116 closer to the mirror assemblies 84 and 86.

As shown in FIG. 4, light is reflected from mirror plane 84 to mirror plane 86. There is a set of mirrors 88 to reflect light from lenses 78. There is one mirror of mirrors 88 per lens of lenses 78.

Each mirror of mirrors 88 can be controlled to rotate in two dimensions, allowing the mirror to direct the reflected light to any position on the second dimensional array 86 of mirrors.

The second mirror plane 86 includes gimbaled mirrors 106. Gimbaled mirrors 106 receive the light reflected from first mirror plane 84. The set of mirrors 106 send light to the set of output lenses 80. There is one mirror of mirror array 106 for each lens of output lens array 80. Each mirror of mirror array 106 directs light to its own dedicated lens of output lens array 80.

In addition to showing a light path comprised of light beams 110, 112, and 116, FIG. 4 also shows a second light path comprised of light beams 130, 132, and 134.

A mirror rotates on two axes: frame, and mirror. In one embodiment, four electrodes (not shown) are used to position the mirror, using electrostatic attraction, so that it can direct a light ray to a specified mirror on the opposite minor plane, called the "target mirror plane." The system is symmetrical in that the second plane of mirrors can be seen as aiming the mirrors to receive a light ray from the first plane. These mirrors are still "targeting" mirrors in the opposite plane. Indeed, the system may be symmetrical, and hence bi-directional.

There are several options for describing a mirror position: frame and mirror axis angles; deflection voltages; or the position that the light ray will hit (or originate from) the target mirror plane.

Since the object is to point to (or avoid) specific target mirrors, the position of a mirror may, in one embodiment, be defined in terms of this Target Mirror coordinate system (TMC)—a Cartesian coordinate system, with mirrors positioned at alternate integral values of X and Y to compensate for the interleaved mirror layout. Similarly, pointing errors and drift may be described as errors in this TMC position, rather than as changes in voltage.

In one embodiment, each mirror plane is elliptical, with the mirrors interleaved (each row is shifted by one half of a mirror spacing). In order to find each mirror, and describe positions between mirrors, the following scheme is used:

The target mirror position is described using a rectangular array, with the X direction defining movement that results from rotation about the mirror axis, and the Y direction defining the movement resulting from rotation about the frame axis.

The array exceeds the maximum bounds of the true mirror plane by some mirror spacings at each side in the X direction and in the Y direction.

In one embodiment, to handle the interleaved mirrors, an array of twice the size is used, with a true mirror placed at every array point within the ellipse where the X and Y values add up to an even number. All intermediate points will contain interpolated values.

All points that do not contain valid mirrors are called virtual points. Those that are outside the ellipse can be used for parking mirrors safely, or as way points when mirrors make multiple moves to avoid crosstalk, as described below with reference to FIG. 7.

In one embodiment, the origin of the array will be at the lower left hand corner.

In one embodiment, it is possible to direct light to points between mirrors. In order to address points between mirrors, the X and Y values are described in a fixed point 8.8 format (8 bits for the integer part, 8 for the fractional part). The integer part addresses the data in the data arrays, the fractional part is used to interpolate between these array values.

Each mirror must know its position in its own mirror plane (X,Y) and its selected parking location (X,Y). That is, a data structure must be built where each mirror has a unique address, such address containing its position and parking location information as well as other information.

Each mirror assembly will show the following information to all other mirrors: (a) Status: Boundary (dummy mirror); Failed; Available (i.e. parked); Moving (in transition); Captured (i.e. light seen, but still vibrating); Stable (but not dithered); Focusing; Working; and (b) the mirror number in opposite plane, which it is trained on (the target mirror).

A mirror voltage (MV) table provides a control surface for each mirror, providing the voltages required to make the mirror reflect the light beam to (from) any point in the target mirror plane. In one embodiment, the mirror voltage table is addressed by the integer values of the target mirror coordinates, and provides the voltages that are needed to point to a particular mirror (as well as the voltages to point midway between mirrors, and to positions outside the mirror plane).

Differential values are not needed in this table, since a bi-linear interpolation is used for non-integral points, using the 4 surrounding values.

There will be a derived value for each mirror point, an interpolated value between mirror points, and extrapolated values for virtual mirror positions outside the mirror plane. In one embodiment, an initial data set for this table for each mirror is downloaded to the DSPs 202, 203 at initialization.

An X,Y Drift table may also be provided, in one embodiment, illustrating deviation of observed mirror position from correct X, Y position. This table contains the delta that must be applied to target mirror coordinates in order to point to the correct target. There is a table for each mirror. In one embodiment, some entries in this table are from direct measurement. The rest are based on prediction. Addressing for this table corresponds to that described for the MV table above. The deltas in X and Y are signed fixed point values of the same scale as the X, Y values used to access the table.

In one embodiment, the drift is calculated and added for each point in a mirror movement profile to determine the voltage needed to move the mirror to each point. In another embodiment, the drift may be calculated and added only at the end points of a movement profile and the voltage needed to move the mirror to the intermediate points may be interpolated.

In one embodiment, all mirrors are always maintained in paths. Thus, to create a new path, existing paths must be broken up and new ones established. Mirrors must arrive at destinations relaxed, stationary and stable.

There are several key issues that underlie the mirror control. One issue is that there is no direct positional feedback from mirrors. In one embodiment, only when a known pair of mirrors are positioned to create a light path is there any knowledge of their actual position.

It is not possible to know much about the dynamic characteristics of a particular mirror. Even when a mirror is part of a light path, the light intensity is sampled at too slow a rate to measure any of the principal resonances of the mirror assembly.

The mirror assembly and its controls are highly cross-connected. Any change to any one control surface could have an impact on all aspects of the mirror behavior, and will open the possibility of exciting any resonance although it is assumed that the control of one mirror will not have an impact on other mirrors, i.e. there should not be any interference between mirrors. Also, the properties of a mirror and its control system drift with time. Central to all these issues is the "connection," that extends from the source light, through the switch, to the final optical power detector.

Various mirror designs are possible, each with a resonant frequency or frequencies that may vary from several hundred cycles/second to tens of thousands of cycles/second. A critical requirement is to move a mirror from one position to the next without exciting its resonant frequencies. One technique is to control the acceleration curve for mirror movements.

However, although resonances and overshoot are in the mirror rotation domain, it is believed that a profile in target mirror coordinates (TMC) will provide a close enough approximation.

Figure 5A:
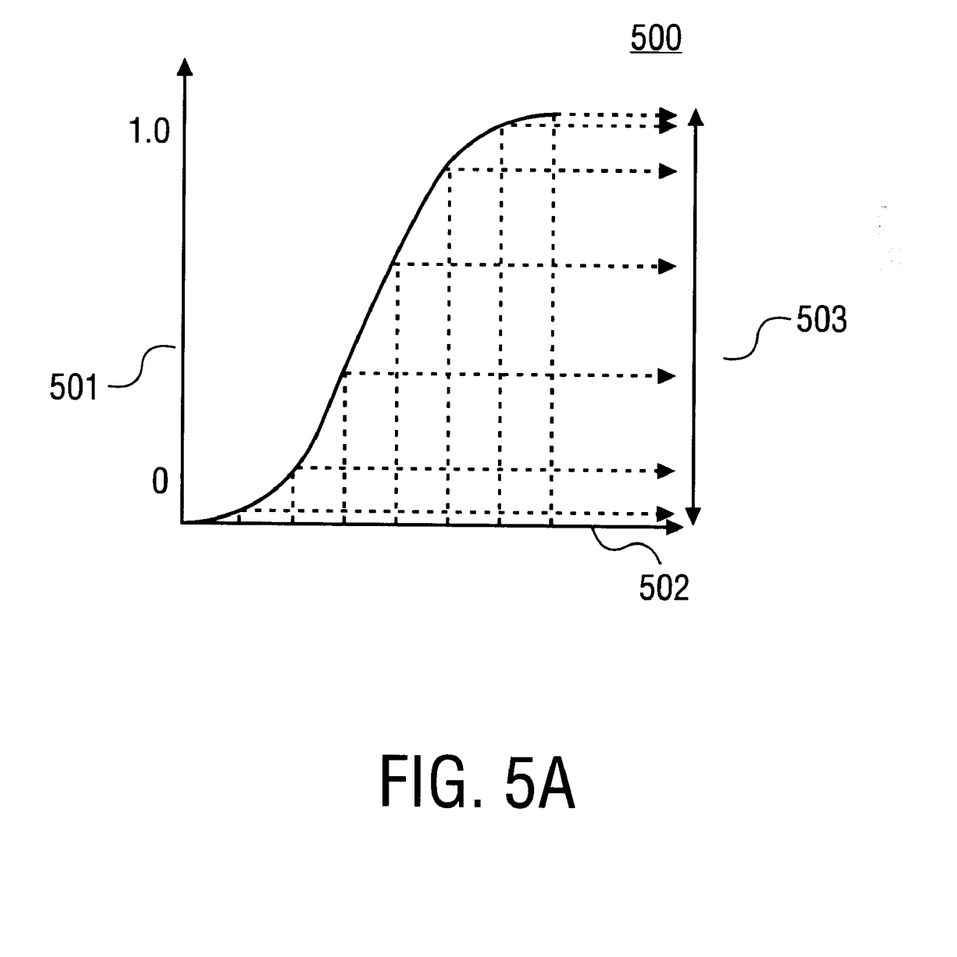
FIG. 5a is a graphical representation of one embodiment of a movement profile for a mirror.

FIG. 5a is a graphical representation of one embodiment of a movement profile 500 for a mirror. Axis 502 shows equal units of time and axis 501 shows the fraction of the path length moved. From the movement profile, an observation may be made of the fraction of the move completed for each step 503.

A mirror 88, 106 may be moved, in one embodiment, in a straight line in target mirror plane coordinates, from the initial position to the target position. The path is constrained, using a slow, controlled acceleration and deceleration profile at the ends of the movement to prevent overshoot. The actual movement profiles are generated from pre-computed tables. An example would be a "cosine squared" profile, such as movement profile 500.

Move profiles may include, in one embodiment, a lookup table containing the ideal ramps, or movement profiles for mirror movement. The move profiles may be designed to be used in "target mirror coordinates," or voltages if the movement is small.

There will be tables corresponding to a variety of time periods. Small moves may be made faster than large moves. Since there is less energy imparted to the mirror and therefore, less energy to excite resonances, the movement may be made in a shorter time.

Each table will have the number of entries appropriate for that length of move (except for the end point, which is always 1.0), so no division or interpolation will be necessary.

The output of each table will consist of a 16 bit fixed point number, that provides the fraction of the path for that point—Most significant bit (Msb)=0.5.

An advantage in this approach is that the mirror position during a move is always known. A straight line path in mirror coordinates can be planned that does not create any interference in other established paths.

Because overshoot can be created by step changes in position for even the smallest of moves, any movement, however small, will need some form of profile. A family of profiles may be available for different distances. Each profile will take a predefined amount of time (synchronized with the update rate of power values).

Because any move will take a known duration, the arrival times can be predicted, and multiple path changes can be synchronized.

Figure 5B:
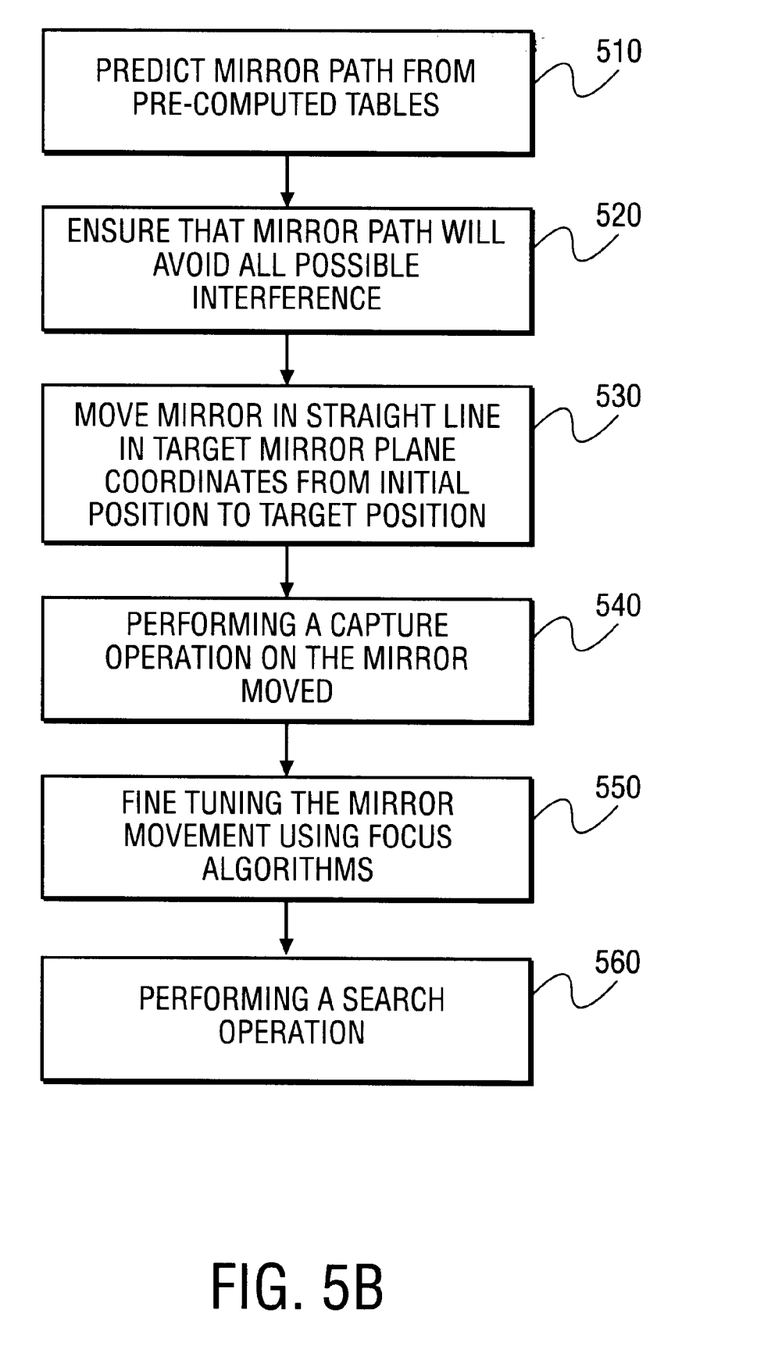
FIG. 5b is a flow diagram of one embodiment of a method of moving a mirror.

FIG. 5b is a flow diagram of one embodiment of a method of moving a mirror. At processing block 510, the MSM predicts mirror path from pre-computed tables. At processing block 520, the MSM ensures that the mirror path will avoid all possible interference, as will be described below with reference to FIGS. 6 and 7. At processing block 530, the MSM moves the mirror in a straight line in TMC from an initial position to a target position.

At processing block 540, the MSM performs a capture operation on the mirror moved. At processing block 550, the mirror movement is fine tuned using focus algorithms. At processing block 560, a search operation is performed, if necessary, to find the optimal mirror configuration. It will be understood that a search operation 560 will be performed only if capture fails to (a) find light and (b) reach the expected power.

In a fully calibrated system a move should place the mirrors in precisely the correct position for optimum performance. Although a move will be close, it may not be accurate. Therefore a move will typically be followed by a capture operation, as performed at processing block 540. After this capture, the path is considered complete.

In a capture operation 540, when a light path has been established between mirrors following a move, or after a search algorithm, the mirrors need to be moved to maximize the light transmission path.

This algorithm attempts to do this by making small changes to the mirror positions, observing the changes in gain at these points, and calculating the optimum position.

The second mirror's goal is to reflect light from the first mirror directly onto the second lens in the light path. The falloff of light as the mirror moves off the center of the lens could be complex, with possible sidelobes (if the light shifts from the center to the side of the lens, internal reflections within the lens can sometimes create secondary peaks in the beamshape).

The first mirror has to reflect light to the second mirror. There are two effects: (a) there is an energy loss as the light beam is moved off the mirror (which will, to some extent, reveal the first lens beam shape) (b) as the center of the beam moves on the second mirror, there will also be a corresponding movement of the beam reflected by the second mirror, across its lens.

The process uses a hill climbing operation. Power readings are taken with the mirror pointing sequentially to four positions surrounding the start position, and at the start and the end of the pattern. An optimum position is calculated from these readings, and the mirror is re-positioned. Both mirrors in a connection are processed alternately.

This process must assume that the peak power value (the goal of the hill climbing) is unknown, and that there is uncertainty in the shape of the beam (which may even be asymmetrical).

A capture operation 540 uses large delta movements (in the order of half a mirror width) to make the hill climb as rapid as possible. Power readings are taken only once for each position. The power value used in the calculation is actually the loss of the system, or Pout/Pin, to compensate for the slow variations in the input power.

Fine tuning will then continue using focus algorithms at processing block 550. A connection, once made, must be maintained in an optimum position. This focus algorithm 550 attempts to do this with minimum changes to the light output.

The process uses a hill climbing operation similar to a "capture", but with much smaller movements, resulting in a much smaller change in power. It is performed continuously before the mirror has had a chance to move from the peak. Small mirror position changes result in changes to the power values close to quantization and noise levels in the detector.

To compensate, the power value used for each point in the hill climbing algorithm is an average of n successive Pout/Pin values. If n=256, noise level could be reduced by approximately 12 dB.

In addition, the variance of these values is calculated to measure the reliability of the light source, and to detect possible resonances in the mirrors. These power readings are taken before and after the hill climbing, and after the final move, to check that all is consistent.

If the new path does not show any light at all, or if the capture operation reveals an unusual beam shape, or a saddle, then a search operation 560 is required.

This operation uses the same core search patterns as the initial calibration of the mirrors, allowing both the first and second mirrors to scan a small area looking for the optimal light path. The size of the search patterns is chosen based on the uncertainty in the drift for each mirror.

It may take in excess of four times the longest significant oscillation period to move a mirror. It is important to keep resonances high if moves are to be made quickly.

Figure 6:
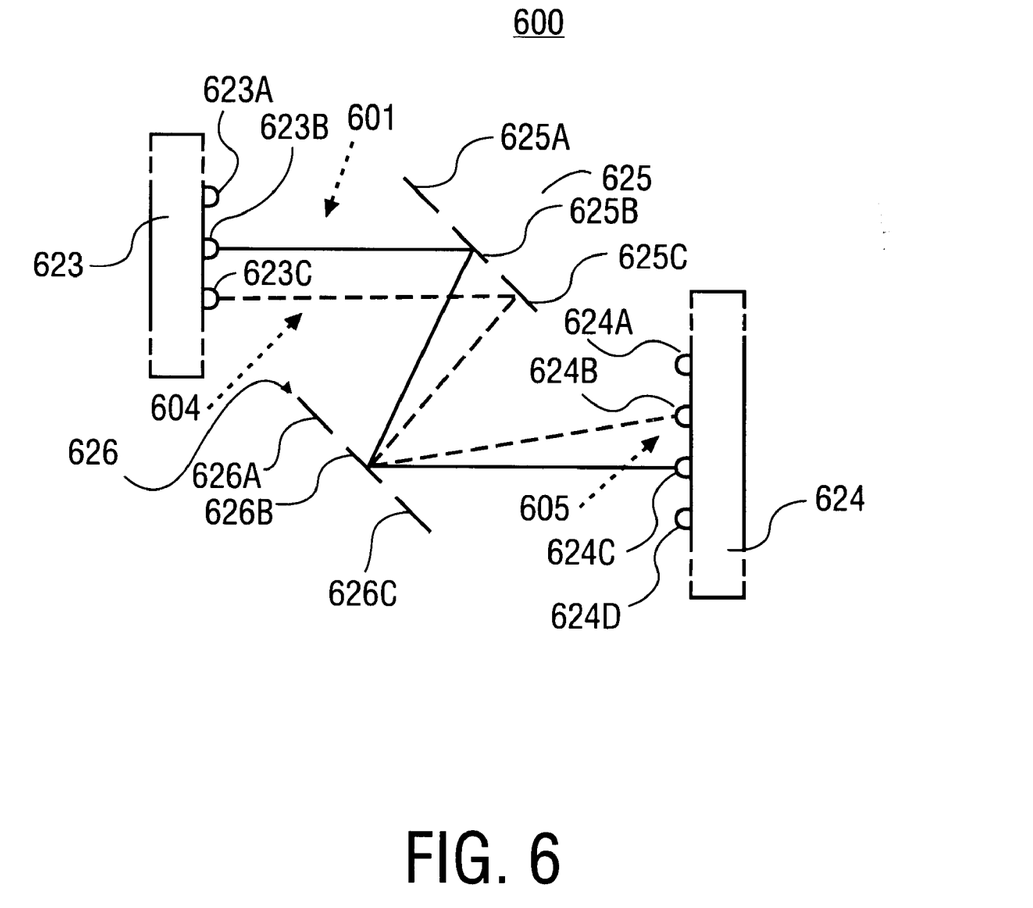
FIG. 6 is a block diagram illustrating crosstalk in one embodiment of a matrix module of an optical cross-connect switch.

FIG. 6 is a block diagram illustrating crosstalk in one embodiment of a matrix module of an optical cross-connect switch. Light is directed by lens 623b of input lens assembly 623 to mirror 625b of first mirror assembly 625 to form existing connection 601. The light is reflected by mirror 625b to mirror 626b of the second mirror plane 626 which reflects the light to a lens 624c of output lens assembly 624.

If a first plane mirror 625a–c is reflecting light from the input fiber 207, then, as it moves, the reflected light ray will move across the target mirror plane 626, probably shining on a few of the mirrors in that plane 626 as it passes by. In most cases, this is not a problem, since the final reflected ray will be so misaligned, and so far off the axis of an output lens 624a–d that it will not reach an output fiber 208.

However, if the angle off axis is small, there may be a small amount of light that can pass through the lens, such as lens 624b (as shown in FIG. 6) and into an output fiber 208. This can occur when the light ray illuminates a target mirror 625c that is in an existing path 604 with a neighbor of the first plane mirror 625b, for example, as shown in FIG. 6. However, this interfering connection 601 requires that the geometry of the MSM is such that this light will play onto an adjacent lens, such as through a cross talk connection 605, rather than between lenses.

One way of avoiding this problem is to turn off the light during a move. This takes time (switching the light paths for working light can take up to 20 ms), and in most cases is not a viable option. The alternative is to create a path for the light ray that does not include any "sensitive" mirrors.

Figure 7:
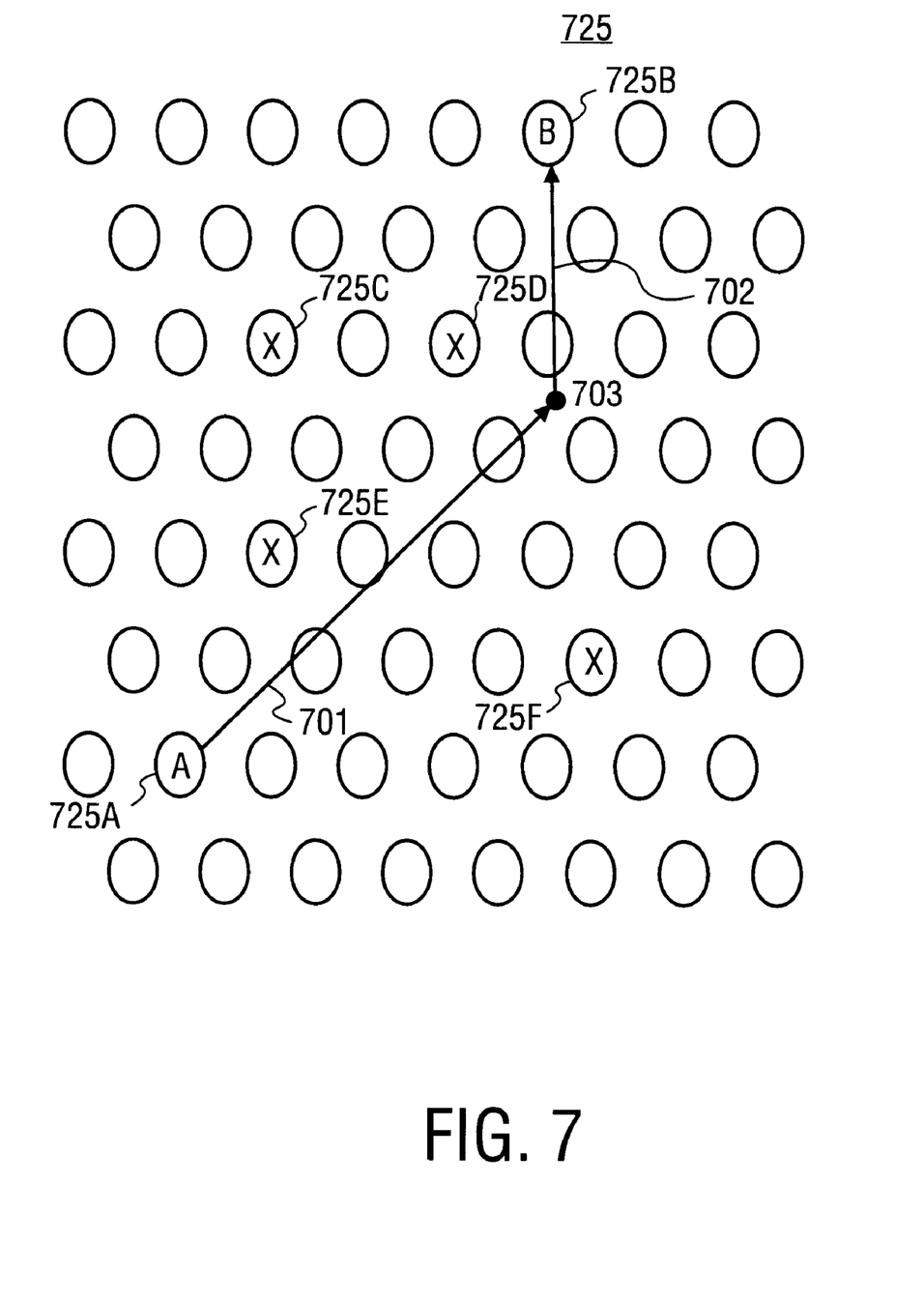
FIG. 7 is a block diagram of a connection avoiding crosstalk in one embodiment of a mirror array of an optical cross-connect switch.

FIG. 7 is a block diagram of a connection avoiding crosstalk in one embodiment of a mirror array of an optical cross-connect switch. Mirror array 725 is a second mirror plane mirror array. A first plane mirror (not shown) must move from a path with second plane mirror A 725a to a path with second plane mirror B 725b.

When planning a move of a mirror in the first mirror plane that has light impinging on it, the target mirrors to avoid are second plane mirrors in paths with 1st plane neighbors, with the following conditions: (a) the neighbors of the 2nd plane mirrors are working paths and (b) mirror/mirror/lens spacing is such that the light path can intercept an adjacent lens. This may be true only for a part of the mirror plane.

The comparative light outputs are such that interference is significant. For example, the path that receives the interference could be at the end of a long reach connection, and the interfering path could be at the source, 20 dB more powerful (in a bi-directional long reach connection, this difference in power level may be common).

The result is that there may be, in one embodiment, as many as six mirrors (the number of nearest neighbors) that may have to be avoided. As shown in FIG. 7, mirrors 725c, 725d, 725e and 725f are mirrors with possible crosstalk. Thus, the first plane mirror being moved is moved from pointing to second plane mirror A 725a along path 701 to point to point 703 in the second mirror plane. Point 703 is in between mirrors. The first plane mirror is then moved from pointing to point 703 to pointing to second plane mirror B 725b along path 702. Thus, mirrors 725c–f, which presented crosstalk possibilities are avoided during the move.

If the measure of drift has recently been updated, moving between mirrors should be safe. Otherwise, it may be better to make two or perhaps three moves, to avoid trouble spots, as shown in FIG. 7.

A similar crosstalk problem can arise if the second mirror 626a–c in a path is moved from an existing path while illuminated with light from the first mirror 625a–c— it can move the reflected ray off its own lens, and onto the neighboring lens. This situation can be avoided by always moving the first mirror 626–c out of the path first, making sure that the first mirror takes a safe path, and ends up at a safe place.

Figure 8A:
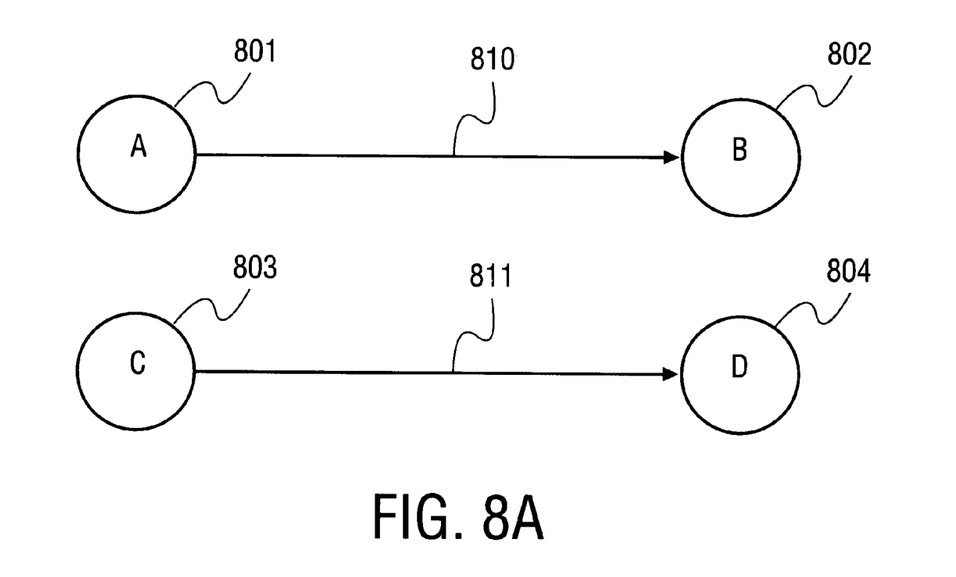
FIGS. 8a–c illustrate a mirror movement.
Figure 8B:
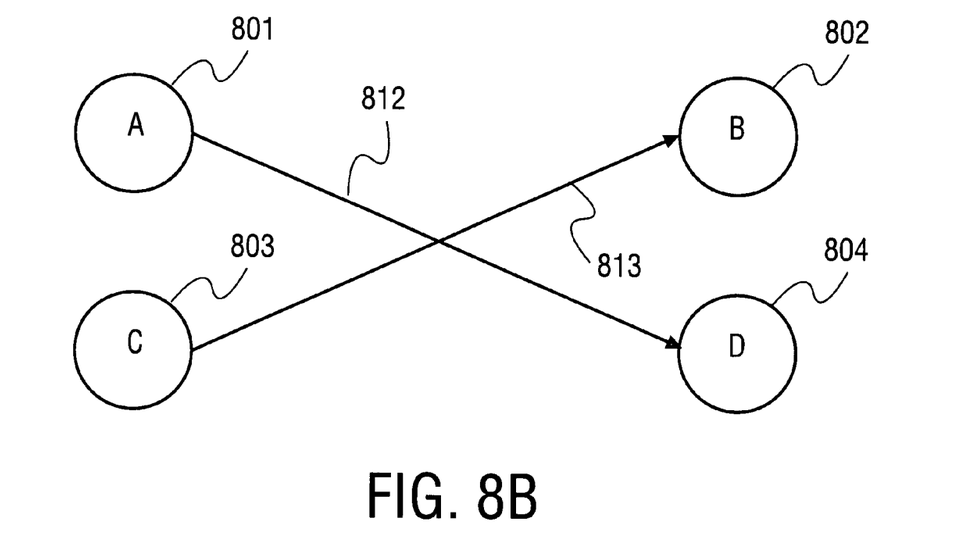

FIGS. 8a and 8b illustrate a mirror movement to form a new connection.

In the example illustrated by FIGS. 8a and 8b, a connection 810 exists between first plane mirror A 801 and second plane mirror B 802, and a connection 81 first plane mirror C 803 and second plane mirror D 804. A new connection 812 must be made between mirror A 801 and mirror D 804, where both mirror A 801 and mirror D 804 are not initially assigned to working connections. Since mirrors A 801 and D 804 will be joined in a new path, mirrors B 802 and C 803 must be joined, in one embodiment, in a new path 813.

Figure 8C:
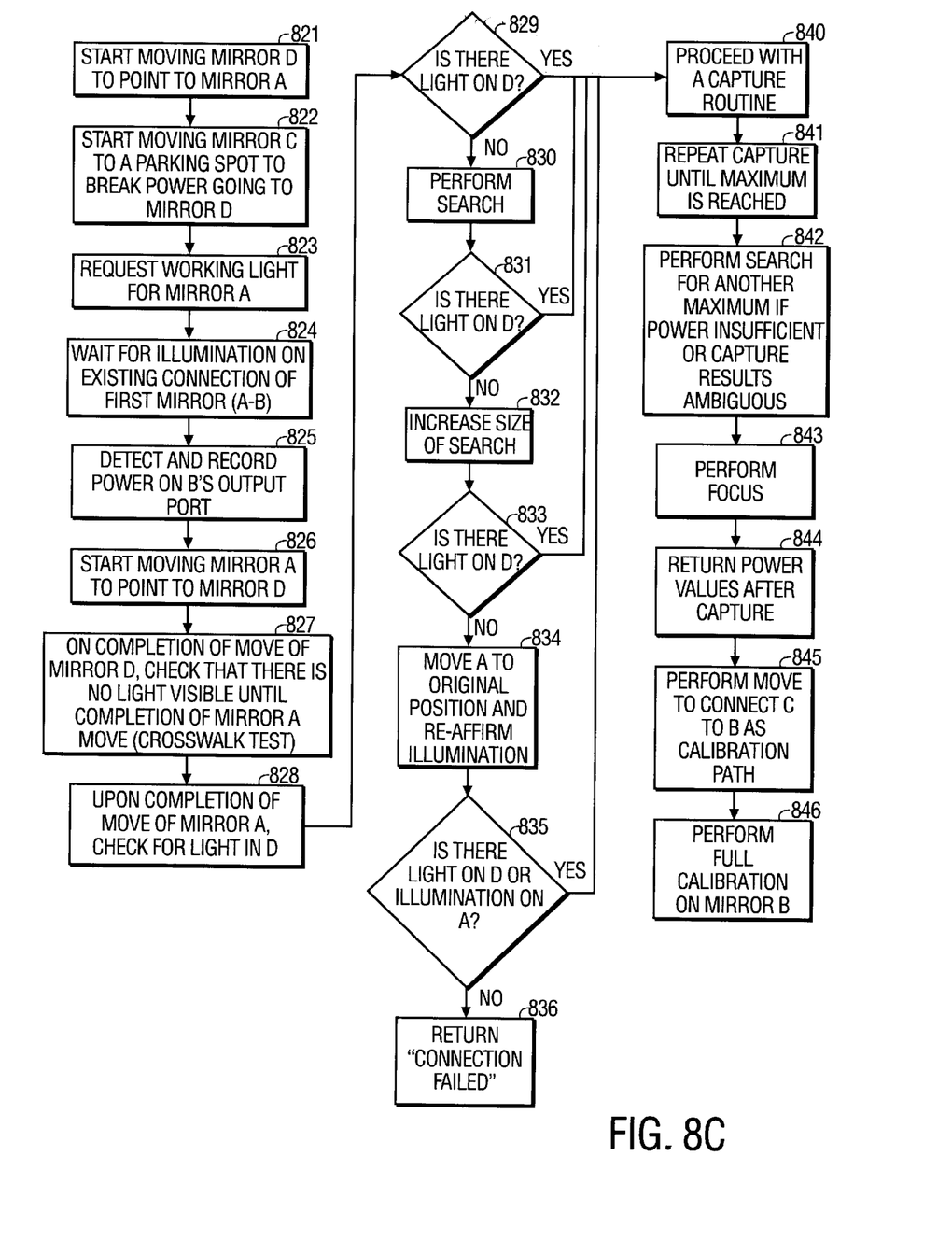

FIG. 8c is a flow diagram of one embodiment of a method of performing the mirror movement illustrated in FIGS. 8a and 8b.

At processing block 821, the matrix processor 201 initiates a move of mirror D 804 to point to mirror A 801. At processing block 822, the matrix processor 201 initiates a first plane mirror move of mirror C 803 to park (i.e. position mirror C 803 out of the way to avoid interference).

At processing block 823, the matrix processor 201 requests working light for mirror A 801. At processing block 824, processor 201 waits for illumination on path A–B 810. At processing block 825, the processor 201 detects the power on mirror B's 802 output port and records the power. Thus, the processor 201 will know what the power output resulting from connection with mirror A 801 should be.

At processing block 826, matrix processor 201 initiates a first mirror plane move of mirror A 801 to D 804.

At processing block 827, upon completion of the move of mirror D 804 to point to mirror A 801, the processor checks to ensure there is no light visible on mirror D 804 until the completion of the mirror A 801 move. Thus, the processor 201 ensures there is no crosstalk.

At processing block 828, upon completion of the move of mirror A 801, the processor 201 checks for light on mirror D 804. At processing block 829, the processor 201 determines whether there is light on mirror D 804. If there is no light on mirror D, at processing block 830, the processor performs a search algorithm.

First, the matrix control processor 201 initializes a mini search pattern for the first mirror (mirror A) 801. Then, the matrix control processor 201 initializes a mini search pattern for the second mirror (mirror D) 804.

If no light is detected as a result of these search patterns, at processing block 831, the size of the search patterns is increased at processing block 832.

If no light is detected, at processing block 833, as a result of the increased size search pattern, mirror A is moved back to its original position at processing block 834. At processing block 835, the processor 201 checks if A is illuminated. If A is not illuminated, then at processing block 836, the processor returns a "connection failed" message. If A is illuminated but no light is seen on the A–D connection 812, then the processor also returns a "connection failed" message at processing block 836.

If light is seen on the A–D connection 812, the processor 201 performs a capture algorithm at processing block 840. In one embodiment, a signal is sent to second mirror plane DSP 203 to perform a capture and, then, a signal is sent to first mirror plane DSP 202 to perform a capture. The capture sequence is repeated at processing block 841 until the peak of the light beam is reached.

If the power is not sufficient or the capture results are ambiguous, a search is performed for another maximum at processing block 842.

At processing block 843, the processor 201 performs a focus algorithm. At processing block 844, optical power readings are taken after the capture. The readings are taken to confirm that there is no loss of power as a result of the new path 812 (by comparing the reading at mirror D's 804 output port with the reading taken previously at mirror B's output port when mirror B 802 was in path 810 with mirror A 801. If there is any loss of power, another search algorithm will be performed, according to one embodiment.

At processing block 845, the processor 201 initiates a move to connect mirror C to mirror B in a calibration path 813. At processing block 846, the processor 201 initiates a full calibration of mirror B.

It will be understood that the processes described herein may be performed by processing logic, which may comprise hardware, software, or a combination of both.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of moving reflectors in an optical cross-connect switch comprising:

initiating a move of a target reflector on a second reflector plane to form a path with a source reflector on a first reflector plane;

initiating a move of a secondary reflector on the second reflector plane in a path with the source reflector to a park position;

initiating a move of the source reflector to form a path with the target reflector;

initiating a move of the secondary reflector on the second reflector plane to form a path with a secondary reflector on the first reflector plane wherein the secondary reflector on the second reflector plane was in a path with the target reflector prior to the initiation of the move; and initiating a move of the secondary reflector on the first plane to complete the path with the secondary reflector on the second reflector plane.

2. The method of claim 1 further comprising moving the source reflector from the secondary reflector to a point in between reflectors on the second reflector plane and moving the source reflector from the point in between reflectors to the target reflector to avoid interference.

3. The method of claim 1 further comprising performing a capture operation on the target reflector and performing a capture operation the source reflector.

4. The method of claim 3 wherein performing a capture operation on the target reflector comprises:

making small changes to the target reflector positions, observing changes in gain at the changed positions, calculating an optimal position of the target reflector, and performing a capture operation on the source reflector comprises:

making small changes to the source reflector positions, observing changes in gain at the changed positions, calculating an optimal position of the source reflector.

5. The method of claim 3 further comprising fine tuning the reflector movement using focus algorithms.

6. The method of claim 1 further comprising:

performing a mini search operation until light is detected on the target reflector wherein the mini search operation comprises performing a mini search on the source reflector and performing a mini search on the target reflector.

7. The method of claim 6 wherein performing the mini search operation comprises calculating a first search pattern based on uncertainty in drift for the source reflector, moving the source reflector to scan a small area with the source reflector for a first optimal light path using the first search pattern;

calculating a second search pattern based on uncertainty in drift for the target reflector; and moving the target reflector to scan a small area with the target reflector for a second optimal light path using the second search pattern.

8. A system for moving reflectors in an optical cross-connect switch comprising:

means for initiating a move of a target reflector on a second reflector plane to form a path with a source reflector on a first reflector plane;

means for initiating a move of a secondary reflector on the second reflector plane in a path with the source reflector to a park position;

means for initiating a move of the source reflector to form a path with the target reflector;

means for performing a capture operation on the target reflector;

means for performing a capture operation the source reflector;

means for initiating a move of the secondary reflector on the second reflector plane to form a path with a secondary reflector on the first reflector plane wherein the secondary reflector on the second reflector plane was in a path with the target reflector prior to the initiation of the move; and means for initiating a move of the secondary reflector on the first plane to complete the path with the secondary reflector on the second reflector plane.

9. The system of claim 8 further comprising:

means for performing a mini search operation until light is detected on the target reflector wherein the mini search operation comprises performing a mini search on the first reflector and performing a mini search on the second reflector.

* * * * *